United States Patent [19]

Gladisch et al.

[11] Patent Number: 4,546,281

[45] Date of Patent: Oct. 8, 1985

[54] MOTOR AND GEARING TO DRIVE A VALVE

[75] Inventors: Manfred Gladisch, Herne; Erwin Winklmann, Oberhausen, both of Fed. Rep. of Germany

[73] Assignee: Deutsche Babcock Werke Aktiengesellschaft, Oberhausen, Fed. Rep. of Germany

[21] Appl. No.: 589,739

[22] Filed: Mar. 15, 1984

[30] Foreign Application Priority Data

Apr. 23, 1983 [DE] Fed. Rep. of Germany ....... 3314781

[51] Int. Cl.$^4$ .......................... H02K 7/06; F16K 31/02
[52] U.S. Cl. .................... 310/83; 251/129.12
[58] Field of Search .................... 310/80, 83; 251/129, 251/133, 134, 136, 227, 249.5, 250, 276, 278, 284, 285, 288, 321–323; 137/251; 74/840, 841, 25, 89.15; 261/DIG. 74

[56] References Cited

U.S. PATENT DOCUMENTS

| | | | |
|---|---|---|---|
| 3,356,874 | 12/1967 | Chiapparelli et al. | 310/83 |
| 3,616,884 | 11/1971 | Jurge | 251/134 X |
| 3,704,853 | 12/1972 | Waller | 251/136 X |
| 3,822,612 | 7/1974 | Sanctuary | 251/134 X |
| 4,111,070 | 9/1978 | Stratienko | 251/134 X |
| 4,393,319 | 7/1983 | Bock | 310/83 X |

Primary Examiner—Mark O. Budd
Attorney, Agent, or Firm—Max Fogiel

[57] ABSTRACT

An armature has a closure that can be displaced along an ascending spindle in a housing. The spindle is connected by means of a spindle sleeve accommodated in the valve housing and a transition bushing fastened to the spindle sleeve with an electric-motor adjusting mechanism. A stroke-limiting nut is screwed onto the spindle. There are an intermediate cover and a spring element between the transition bushing and the spindle sleeve. The transition bushing and the intermediate cover can be displaced along the spindle.

1 Claim, 4 Drawing Figures

MOTOR AND GEARING TO DRIVE A VALVE

BACKGROUND OF THE INVENTION

The present invention relates to an armature with a closure that can be displaced along an ascending spindle in a housing, the spindle being connected by means of a spindle sleeve accommodated in the valve housing and of a transition bushing fastened to the spindle sleeve with an electric-motor adjusting mechanism and a stroke-limiting nut being screwed onto the spindle.

Armatures of this type must be remotely operated with an electric-motor adjusting mechanism. Whereas the armature necessitates a translational force (introduction and extraction of a spindle) for its operation, the adjusting mechanism carries out a rotational motion. The torque is converted into an axial force by means of a spindle sleeve mounted in a ball bearings and of trapezoidal threading cut into the valve spindle. The motion of the spindle as it closes the armature is limited by a stroke-limiting nut screwed onto and secured on the valve spindle.

When a combination of armature and adjusting mechanism is of high significance from the aspect of safety, as in a nuclear power plant for example, various failure potentials must be reliably controlled. One potential failure is the breakdown of power controls, when the adjusting mechanism drives the stroke-limiting nut at a maximum torque that is higher than the flywheel effect on the spindle sleeve that results from the rotating masses. The height of the flywheel effect during startup into stroke limiting at a given adjustment mechanism is a function of the rigidity of the armature. The known system has a very high rigidity. The resulting initiating forces and moments can lead in many cases to destruction of the armature and adjusting mechanism.

SUMMARY OF THE INVENTION

The object of the present invention is to decrease armature rigidity enough in spite of constricted installation conditions to reduce the resulting superelevation moments to a manageable level.

This object is attained in accordance with the invention in an armature of the aforesaid type wherein there are an intermediate cover and a spring element between the transition bushing and the spindle sleeve and wherein the transition bushing and the intermediate cover can be displaced along the spindle.

In one practical embodiment of an armature in accordance with the invention the intermediate cover is cast onto the transition bushing.

In another practical embodiment of the armature in accordance with the invention the spring element consists of cup springs.

In another practical embodiment of the armature the spring element consists of several resilient rings that can be displaced toward each other axially and have conical faces that rest together.

In another practical embodiment of the armature the spindle sleeve has a stop at a distance above the transition bushing and wherein there is another, lower, spring element on the other side of the spindle mount between the spindle sleeve and the housing.

In another practical embodiment the spring element is surrounded by an annular spring element and wherein the annular spring element is positioned on one of its faces at a distance from the intermediate cover and rests with its other face on an initiating ring that is connected to the spindle sleeve.

In another practical embodiment there is an additional annular spring element on the other side of the initiating ring that surrounds the additional spring element between the spindle sleeve and the housing and is positioned such that a distance is maintained between the initiating ring and the housing.

In yet another practical embodiment there is a non-resilient initiating bushing between the initiating ring and the annular spring elements.

When a failure occurs, the stroke-limiting nut advances to the transition bushing. This displaces the transition bushing and the intermediate cover axially and tensions the spring elements. The rotating transition bushing simultaneously rubs against the stroke-limiting nut and intermediate cover. The resulting frictional moments and spring force consume the energy introduced. The adjusting mechanism is slightly braked. The level of the braking moments can be adjusted by selecting appropriate springs.

The armature in accordance with the invention is distinguished by the following advantages. Since the energy is annihilated by friction, only small springs are needed. The elements needed to annihilate the energy are small enough to be installed conveniently. The drive components utilized for normal operation are not affected, which means that the spindle always assumed a defined position and that the spring elements are not stressed by spindle forces during normal operation.

Some preferred embodiments of the invention will now be described with reference to the attached drawings, wherein

DETAILED DESCRIPTION OF THE PREFERRED EMBODIMENTS

Figure 1:
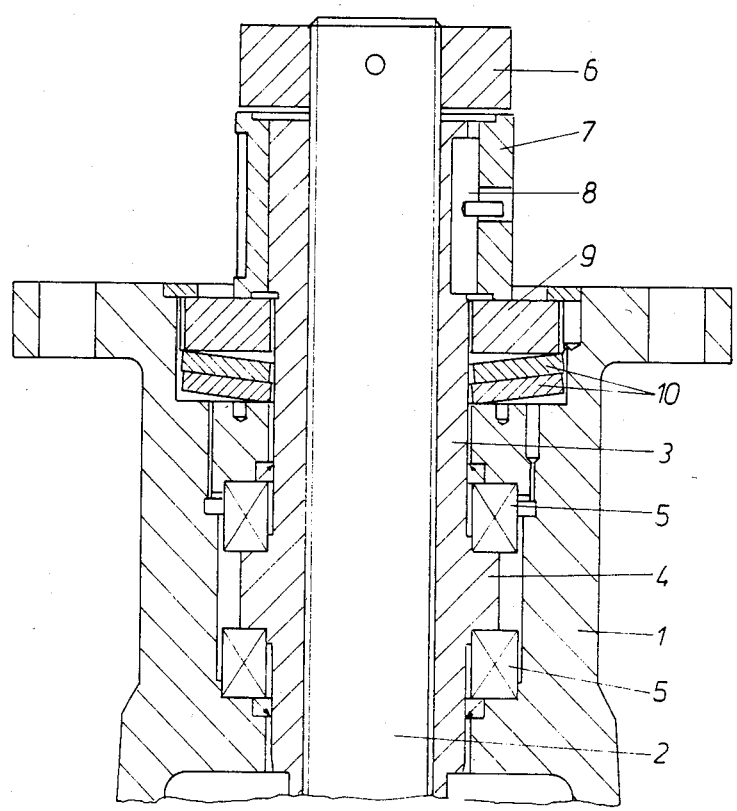
FIG. 1 is a section through one embodiment of an armature in accordance with the invention and FIGS. 2 through 4 are sections through other embodiments of an armature in accordance with the invention.

Only the upper part of the housing 1 of the armature and the mechanism that drives the spindle 2 are illustrated. Spindle 2 passes through a hole bored in housing 1.

A closure that is not illustrated is fastened to the bottom of spindle 2. The closure is forced against or lifted off of sealing areas on the side of the housing when the spindle carries out a translational motion. The translational motion is transmitted to spindle 2 through a spindle sleeve 3. Spindle sleeve 3 and valve spindle 2 each have mutually engaging trapezoidal threading. A expansion 4 is cast into the side of spindle sleeve 3. The sleeve is mounted through the intermediary of expansion 4 in two separated axial ball bearings 5 inside housing 1. The motion of the spindle when it closes the armature is limited by a stroke-limiting nut 6 that is screwed onto and secured on the head of spindle 2.

An electrical-motor adjusting mechanism that is not illustrated engages spindle sleeve 3 through the intermediary of a transition bushing 7. The transition bushing 7 of the armature in accordance with the invention is connected to spindle sleeve 3 through a feather 8 in such a way that transition bushing 7 can be displaced along spindle 2.

In FIG. 1 there is an intermediate cover 9 between transition bushing 7 and valve housing 1 or the expansion 4 in spindle sleeve 3. Intermediate cover 9 surrounds spindle sleeve 3 and spindle 2 and can also be displaced along the spindle.

Between intermediate cover 9 and housing 1 or the expansion 4 in spindle sleeve 3 is a spring element that surrounds spindle sleeve 3. The spring element depicted in FIG. 1 consists of several stacked cup springs 10.

When a failure occurs in which the adjusting mechanism does not turn itself off once closing has been completed and continues to act on transition bushing 7, transition bushing 7 and intermediate cover 9 are displaced in the direction in which spindle 2 moves to close the armature. This loads cup springs 10, and transition bushing 7 rubs, as it continues to rotate, against stroke-limiting nut 6 and intermediate cover 9 until the resulting frictional moment brakes the energy introduced into transition bushing 7 by the adjusting mechanism and the mechanism stops.

Figure 2:
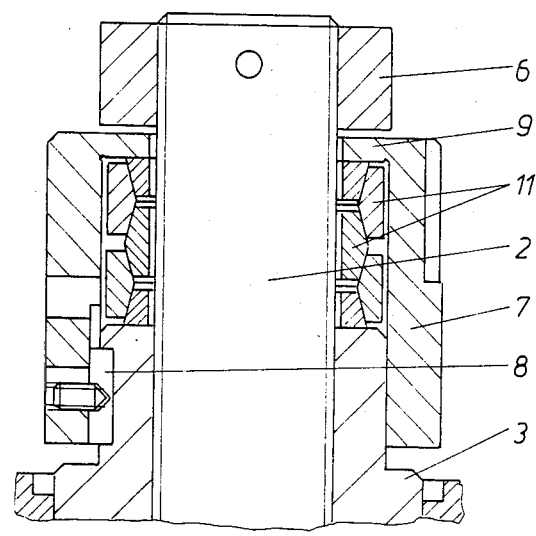

The armature illustrated in FIG. 2 works in the same way as that illustrated in FIG. 1. In this embodiment, however, intermediate cover 9 is cast in one piece with transition bushing 7 and constitutes its upper demarcation. Transition bushing 7 and intermediate cover 9 accordingly constitute a single piece. The spring element in this embodiment is inserted between intermediate cover 9 and the upper face of spindle sleeve 3. It is accordingly demarcated inside by spindle sleeve 3 and outside by transition bushing 7.

The spring element is FIG. 2 consists of several resilient rings 11. Resilient rings 11 rest on their conical faces. Resilient rings 11 can be displaced axially together, sliding along their conical faces in such a way that the diameter of at least one ring 11 expands.

The armature illustrated in FIG. 3 differs from those illustrated in FIGS. 1 and 2 in having another, lower, spring element 12 below the expansion 4 in spindle sleeve 3. Lower spring element 12 rests against housing 1 and spindle sleeve 3. The same type of spring, cup springs (FIG. 1) or resilient rings (FIG. 2) for example, is employed for the upper and lower spring elements. Spindle sleeve 3 has a stop, a stop nut 13 for example, above transition bushing 7.

Figure 3:
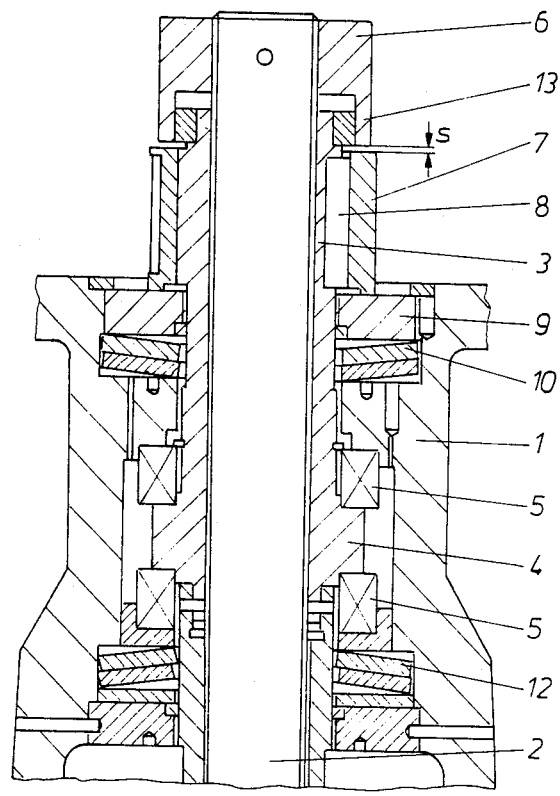

The armature illustrated in FIG. 3 operates in the closing direction like the armatures illustrated in FIGS. 1 and 2. Lower spring element 12 also participates in the closing direction. With the armature open, spindle sleeve 3 is drawn against a rear seating in the cover of housing 1 to relieve the stuffing box. The damping system to be described also prevents impermissibly high stressing of the transmission components in this direction as well when the power controls fail. Spindle sleeve 3 is accordingly drawn against lower spring element 12. Once it has traveled the distance s between stop nut 13 and transition bushing 7, spindle sleeve 3 also tensions upper cup springs 10 through the intermediary of stop nut 13, transition bushing 7, and intermediate cover 9. A frictional moment between transition bushing 7 and intermediate cover 9 occurs simultaneously. The spring forces and the frictional moment damp the moment of the adjusting mechanism.

Figure 4:
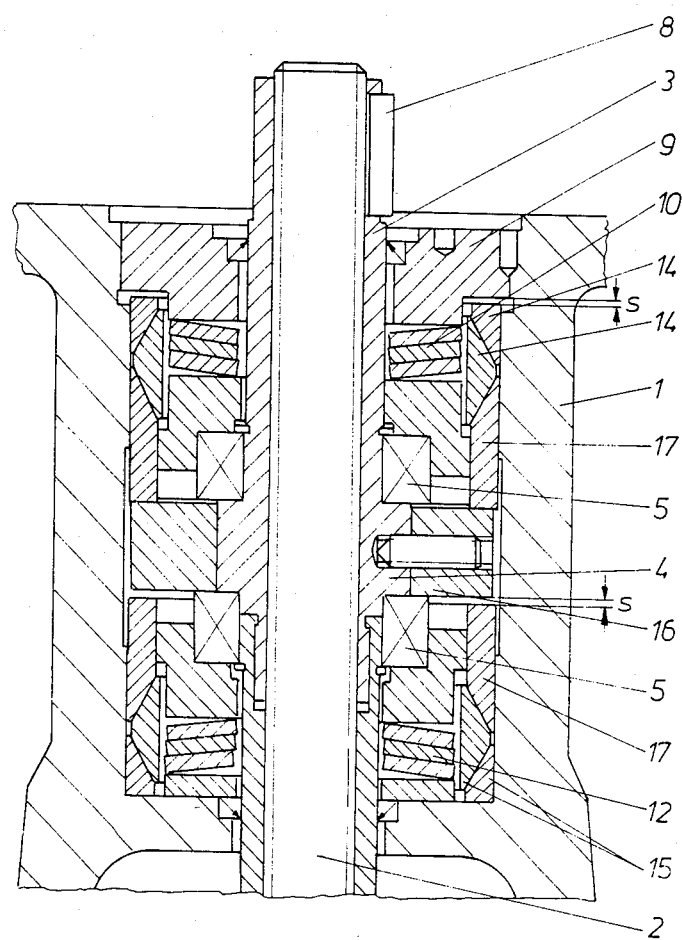

The aforesaid armatures are intended for switching off the adjusting mechanism path-dependently. The armature illustrated in FIG. 4 can be employed to switch off the mechanism in accordance with torque. The damping system being exploited operates in accordance with spindle force, with the same damping principle utilized in the opening and closing directions. The damping system comprises upper and lower annular spring elements 14 and 15 that surround the spring elements constituted by cup springs 10 and 12. Annular spring elements 14 and 15 are annular springs with conical faces. An initiating ring 16 is connected to spindle sleeve 3. There are non-resilient initiating bushings 17 on each side of ring 16. Annular spring elements 14 and 15 rest on initiating bushings 17. A distance s is always maintained from initiating ring 16 and intermediate cover 9. The upper and lower cup springs 10 and 12 are designed so that distance s will not exceed a certain safety limit in either direction as a result of the forces that occur in normal operation.

When the power controls fail, the spindle forces increase, distance s is covered, and a frictional moment develops between initiating ring 16 and initiating bushings 17. Annular ring elements come into play simultaneously. The frictional moment and the forces on cup springs 10 and 12 and annular spring elements 14 and 15 weakly brake the adjusting mechanism.

The present specification and claims are of course intended solely as illustrative of one or more potential embodiments of the invention and must not be construed as limiting it in any way. The invention may accordingly be adapted and modified in many ways without deviating from the theory behind it or exceeding its scope of application.

We claim:

1. Armature with a closure that can be displaced along an ascending spindle within a housing, comprising: a valve housing and a spindle sleeve in said housing; a transition bushing fastened to said spindle sleeve; said spindle being connected by said spindle sleeve and said transition bushing with an electric-motor adjusting means; a stroke-limiting nut screwed onto said spindle; an intermediate cover and a spring element between said transition bushing and said spindle sleeve; said transition bushing and said intermediate cover being displaceable along the spindle, said stroke-limiting nut moving against said transition bushing when said spindle is driven to an end position and continuous to be driven for displacing axially said transition bushing and said intermediate cover to apply load to said spring element, said transition bushing rubbing during rotation against said stroke-limiting nut and said intermediate cover for reducing energy and braking slowly said armature when said spindle continues to be driven after having reached an end position; said intermediate cover being cast onto said transition bushing; said spring element comprising a plurality of resilient rings that are displaceable toward each other axially and have conical faces resting together; said spindle sleeve having a stop at a distance above said transition bushing, and another lower spring element on another side of the spindle mount between said spindle sleeve and said housing; said spring element being surrounded by an annular spring member, said annular spring member being positioned on one of its faces at a distance from said intermediate cover and resting with its other face on an initiating ring connected to said spindle sleeve; an additional annular spring member on another side of said initiating ring surrounding said spring element between said spindle sleeve and said housing and being positioned so that a distance is maintained between the initiating ring and said housing; and a non-resilient initiating bushing between said initiating ring and said annular spring member.

* * * * *